United States Patent
Gollnick (10) Patent No.: US 12,110,867 B2
(45) Date of Patent: Oct. 8, 2024

(54) WIND TURBINE CONTROL BASED ON REINFORCEMENT LEARNING

(71) Applicant: Siemens Gamesa Renewable Energy A/S, Brande (DK)

(72) Inventor: Bert Gollnick, Hamburg (DE)

(73) Assignee: Siemens Gamesa Renewable Energy A/S, Brande (DK)

( * ) Notice: Subject to any disclaimer, the term of this patent is extended or adjusted under 35 U.S.C. 154(b) by 47 days.

(21) Appl. No.: 17/639,925

(22) PCT Filed: Aug. 13, 2020

(86) PCT No.: PCT/EP2020/072731
§ 371 (c)(1),
(2) Date: Mar. 3, 2022

(87) PCT Pub. No.: WO2021/052686
PCT Pub. Date: Mar. 25, 2021

(65) Prior Publication Data
US 2022/0325696 A1    Oct. 13, 2022

(30) Foreign Application Priority Data
Sep. 16, 2019 (EP) .................................... 19197556

(51) Int. Cl.
*F03D 7/04* (2006.01)
(52) U.S. Cl.
CPC ........ *F03D 7/046* (2013.01); *F05B 2270/404* (2013.01); *F05B 2270/709* (2013.01)
(58) Field of Classification Search
CPC ...... F03D 7/026; F03D 7/046; G05B 13/0265
See application file for complete search history.

(56) References Cited

U.S. PATENT DOCUMENTS

| | | | |
|---|---|---|---|
| 8,494,980 B2 * | 7/2013 | Hans .................... | G05B 13/027 706/14 |
| 2010/0241243 A1 * | 9/2010 | Hans ..................... | G06N 20/00 700/12 |

(Continued)

FOREIGN PATENT DOCUMENTS

| | | | | |
|---|---|---|---|---|
| CA | 2651290 C | * | 11/2013 | ............. F03D 17/00 |
| CN | 102102626 A | | 6/2011 | |

(Continued)

OTHER PUBLICATIONS

Bech, J. et al. Extending the life of wind turbine blade leading edges by reducing the tip speed during extreme precipitation events. Wind Energy Science Discussions. Feb. 2018. https://doi.org/10.5194/wes-2017-62 (Year: 2018).*

(Continued)

*Primary Examiner* — Topaz L. Elliott
(74) *Attorney, Agent, or Firm* — Schmeiser, Olsen & Watts LLP (57) ABSTRACT

Methods, systems, and devices for wind turbine control based on reinforcement learning are disclosed. The method comprises receiving data indicative of a current environmental state of the wind turbine, determining one or more controlling actions of the wind turbine based on the current environmental state of the wind turbine and a reinforcement learning algorithm, and applying the determined one or more controlling actions to the wind turbine.

12 Claims, 4 Drawing Sheets

(56) References Cited

U.S. PATENT DOCUMENTS

| | | | | |
|---|---|---|---|---|
| 2015/0233348 A1* | 8/2015 | Hiremath | ................ | F03D 7/026 |
| | | | | 416/61 |
| 2016/0040602 A1* | 2/2016 | Brummel | ............. | G05B 13/029 |
| | | | | 700/287 |
| 2016/0040603 A1* | 2/2016 | Düll | ....................... | G06N 3/126 |
| | | | | 700/287 |
| 2017/0090429 A1* | 3/2017 | Bassily | ................ | G05B 13/027 |
| 2020/0233384 A1* | 7/2020 | Iwane | .................... | G06N 3/006 |
| 2021/0004717 A1* | 1/2021 | Okada | ................... | G06N 3/045 |
| 2022/0145857 A1* | 5/2022 | Harden | ................... | F03D 7/046 |

FOREIGN PATENT DOCUMENTS

| | | | | |
|---|---|---|---|---|
| CN | 102708377 A | * | 10/2012 | |
| DE | 102011075337 A1 | * | 11/2012 | ............. G05B 17/02 |
| DE | 102011076969 A1 | * | 12/2012 | ........... G05B 13/027 |
| EP | 3406894 A1 | | 11/2018 | |
| JP | 2013225192 A | * | 10/2013 | |
| JP | 2019146420 A | | 8/2019 | |

OTHER PUBLICATIONS

International Search Report & Written Opinion for PCT/EP2020/072731 issued Nov. 3, 2020.

Tomin Nikita et al: "Intelligent Control of a Wind Turbine based on Reinforcement Learning", 2019 16th Conference on Electrical Machines, Drives and Power Systems (ELMA), IEEE, Jun. 6, 2019.

Wei Chun et al: "Reinforcement-Learning-Based Intelligent Maximum Power Point Tracking Control for Wind Energy Conversion Systems", IEEE Transactions on Industrial Electronics, IEEE Service Center, Piscataway, NJ, USA, vol. 62, No. 10, Oct. 1, 2015.

Bin Qin et al: "Pitch angle control based on renforcement learning", The 26th Chinese Control and Decision Conference (2014 CCDC), IEEE, May 31, 2014 (May 31, 2014).

* cited by examiner

WIND TURBINE CONTROL BASED ON REINFORCEMENT LEARNING

CROSS-REFERENCE TO RELATED APPLICATIONS

This application claims priority to PCT Application No. PCT/EP2020/072731, having a filing date of Aug. 13, 2020, which claims priority to EP Application No. 19197556.4, having a filing date of Sep. 16, 2019, the entire contents both of which are hereby incorporated by reference.

FIELD OF TECHNOLOGY

The following relates to methods and devices for controlling a wind turbine by utilizing a reinforcement learning algorithm.

BACKGROUND

Wind turbines have been used for many years as a more environmentally friendly energy source. Depending on the wind speed, wind turbines will produce more or less energy. Typically, operation of a wind turbine below a certain wind speed is not feasible.

Thus, typically, each wind turbine has a pre-defined cut-in wind speed. Whenever the real-time wind speed—e.g., measured by a nacelle anemometer—exceeds the cut-in wind speed, the wind turbine will start-up to produce power. For wind speeds below the cut-in wind speed, the wind turbine is idling.

Such techniques of using a simple predefined threshold as cut-in wind speed face certain restrictions and drawbacks. For example, sometimes the feasibility of starting the wind turbine to produce energy depends not only by the local wind speed (typically taken as a point measurement on hub height), but also other environmental parameters. Examples include the wide-area wind field, especially wind shear (both vertically and horizontally over the rotor area of the wind turbine). In addition, the vertical wind shear is mainly driven by temperature. Further, turbulence intensity is a main contributor to the kinetic energy in the wind. The temperature and site elevation influence air density, which linearly impacts the energy in the wind field.

Consequently, in scenarios in which the cut-in wind speed is locally defined, the wind turbine cannot be controlled precisely and thus the power output of the wind turbine is not optimal.

SUMMARY

An aspect relates to advanced techniques of controlling the wind turbine. In particular, there is a need to control the wind turbine taking into account various environmental parameters.

A method of controlling a wind turbine comprises receiving data indicative a current environmental state of the wind turbine. The method also comprises determining one or more controlling actions of the wind turbine based on the current environmental state of the wind turbine and a reinforcement learning algorithm. The method further comprises applying the determined one or more controlling actions to the wind turbine.

A system for controlling a wind turbine comprises one or more computers, the one or more computers are configured to receive data indicative of a current environmental state of the wind turbine; determine one or more controlling actions of the wind turbine based on the current environmental state of the wind turbine and a reinforcement learning algorithm; and apply the determined one or more controlling actions to the wind turbine.

A device for controlling a wind turbine, the device comprising one or more processors, the one or more processors are configured to receive data indicative of a current environmental state of the wind turbine; determine one or more controlling actions of the wind turbine based on the current environmental state of the wind turbine and a reinforcement learning algorithm; and apply the determined one or more controlling actions to the wind turbine.

A computer program product (non-transitory computer readable storage medium having instructions, which when executed by a processor, perform actions) or a computer program or a computer-readable storage medium includes program code. The program code can be executed by at least one processor. Executing the program code causes the at least one processor to perform a method of controlling a wind turbine. The method comprises receiving data indicative of a current environmental state of the wind turbine; determining one or more controlling actions of the wind turbine based on the current environmental state of the wind turbine and a reinforcement learning algorithm; and applying the determined one or more controlling actions to the wind turbine.

It is to be understood that the features mentioned above and those yet to be explained below may be used not only in the respective combinations indicated, but also in other combinations or in isolation without departing from the scope of embodiments of the invention.

BRIEF DESCRIPTION

Some of the embodiments will be described in detail, with reference to the following figures, wherein like designations denote like members, wherein.

DETAILED DESCRIPTION

In the following, embodiments of the invention will be described in detail with reference to the accompanying drawings. It is to be understood that the following description of embodiments is not to be taken in a limiting sense. The scope of embodiments of the invention is not intended to be limited by the embodiments described hereinafter or by the drawings, which are taken to be illustrative only.

The drawings are to be regarded as being schematic representations and elements illustrated in the drawings, which are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

Various techniques described herein generally relate to controlling a wind turbine. More specifically, one or more operational parameters of the wind turbine can be controlled, by applying one or more respective controlling actions. As a general rule, the kind and type of operational parameters that are subject to the control can vary in the various examples described herein. For instance, start-up and idling of the wind turbine could be controlled.

When idling, the wind turbine blades can be fixed or freewheeling. However, a generator of the wind turbine does not connect to a power grid, i.e., the wind turbine does not transmit electricity to the power grid. Start-up then marks the transition into a mode in which energy is generated by the generator and transmitted to the power grid by a connection between the generator and the power grid. The blades are rotating and driven by the wind.

Figure 1:
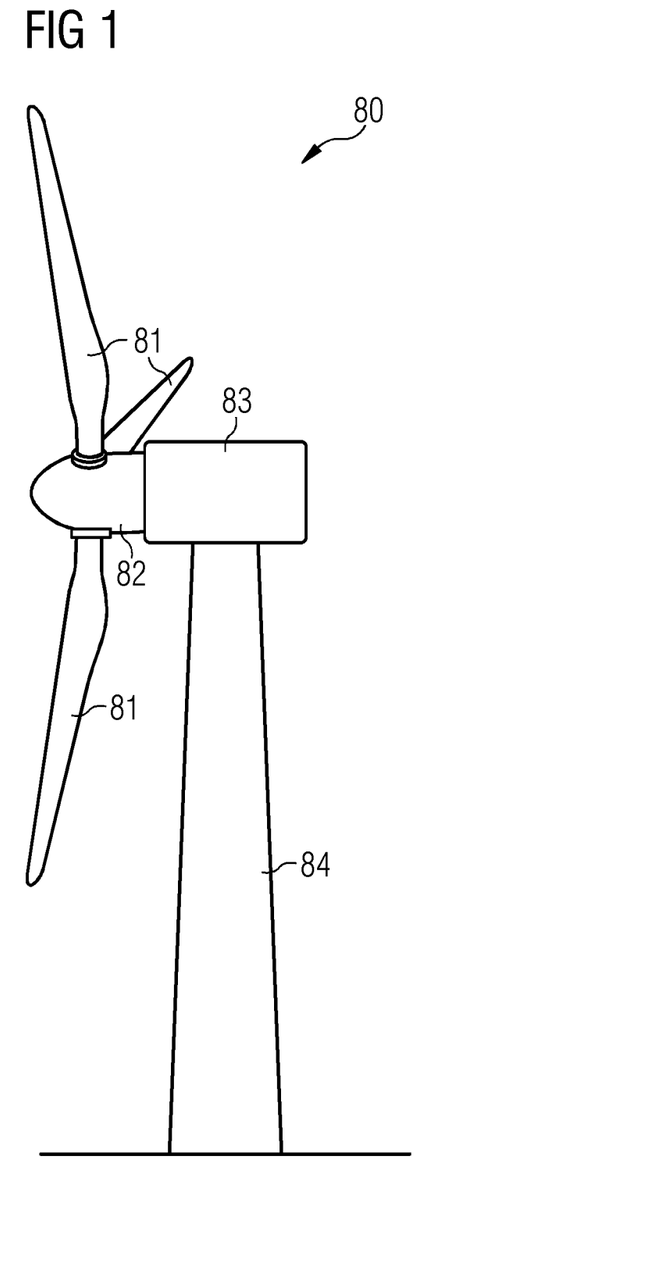
FIG. 1 schematically illustrates a wind turbine.

FIG. 1 schematically illustrates an exemplary wind turbine 80. The wind turbine 80 includes blades 81 attached to a hub 82. The hub 82 is connected to a nacelle 83, mounted on a tower 84. The nacelle 83 houses a generator, coupled with the hub rotating along with the blades 81. This connection can be via a shaft and gear.

There are various operational parameters that can be subject to controlling actions. Examples include: configuration of the gear; pitch angle of the blades 81; start-up and idling; yaw angle of the nacelle 82: etc.

The controlling actions associated with the operational parameters can be determined based on certain logic that relies on reinforcement learning.

Various techniques described herein generally relate to reinforcement learning. Reinforcement learning generally describes a machine-learning process associated with taking an appropriate action (here: how to map one or more environmental parameters indicating an environmental state to one or more controlling actions of the wind turbine) that maximizes a reward (here: various options exist, e.g., power output). Reinforcement learning is generally different from supervised learning: labeled training data is not required; rather, reinforcement learning enables to learn during operation by monitoring the reward.

Data indicative of the current environmental state is received and one or more controlling actions are determined.

Various techniques are based on the finding that reference techniques—in which a wind turbine has a pre-defined cut-in wind speed—face certain restrictions and drawbacks. For instance, the power output often does not only depend on the wind speed, but rather the complete wind field (especially wind shear, both vertically and horizontally over the rotor area) rather than just a point measurement on hub height. The vertical wind shear is mainly driven by temperature. The mounting of the anemometer might negatively impact the wind speed measurement. The measurement of parameters might be wrong. The turbulence intensity is a main contributor to the kinetic energy in the wind, but is not part of the existing cut-in procedure. Temperature and site elevation drive the air density, which linearly impacts the energy in the wind field. None of these parameters are part of the current control scheme on cut-in behavior. So, no day/night, or seasonal variations are covered.

These drawbacks are mitigated by the techniques described herein by using reinforcement learning. All such environmental parameters or states as described above can be used in connection with the reinforcement learning. Here, the learning process is permanently ongoing and challenges itself.

After the one or more controlling actions have been determined, the determined one or more controlling actions are applied to the wind turbine 80.

Figure 2:
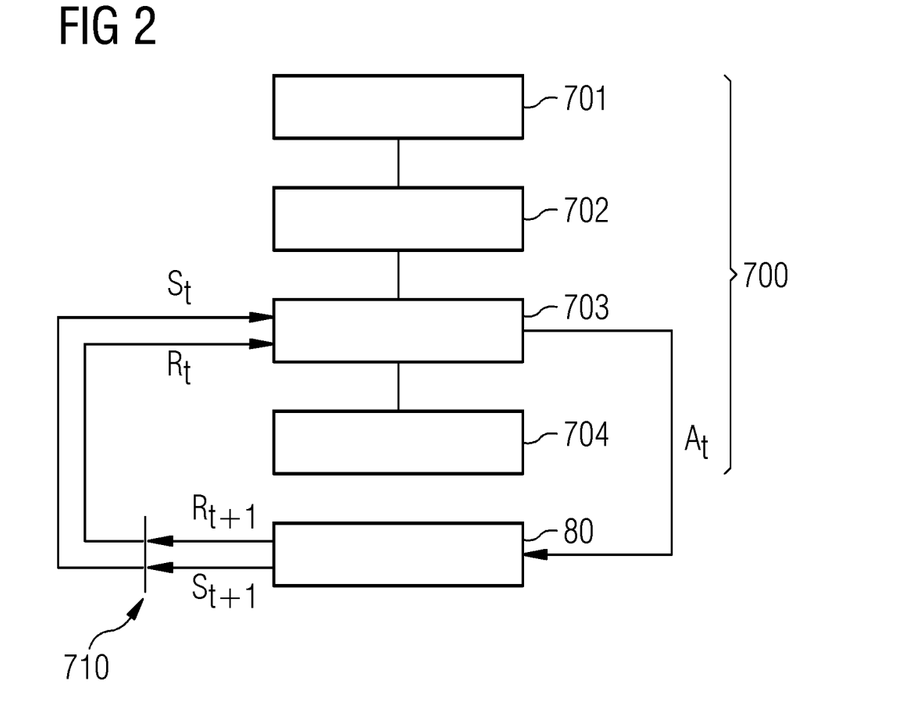
FIG. 2 schematically illustrates a reinforcement learning algorithm according to various examples.

FIG. 2 schematically illustrates aspects with respect to a reinforcement learning algorithm 700.

Generally speaking, reinforcement learning is a type of machine learning, and it is different from the other machine-learning techniques. Its inherent components are an agent module 703, an environment module 701, a policy module 702, and a reward module 704.

The reinforcement learning algorithm 700 includes an environmental module 701. The environmental module 701 is configured to receive data indicative of one or more environmental states of an environment of the wind turbine 80.

Examples of environmental states (or parameters) of the wind turbine 80 that can be used in the various examples described herein include temperature, rotational speed of the blades, location including longitude and latitude, air pressure, precipitation, humidity, local time, wind speed, a turbulence intensity, a site elevation, a vertical wind shear, or a horizontal wind shear etc. The techniques described herein are flexible in that a larger or smaller number of environmental states (or parameters) can be considered.

There are various options available of obtaining the data indicative of environmental states. For instance, data indicative of environmental states can be measured by one or more sensors. Alternatively, or additionally, data indicative of environmental states can also be simulated or generated by one or more computer programs or input by experts. For example, the simulated data indicative of environmental states can be one or more outputs of a function in response to one or more inputs of measurement data obtained from one or more sensors. For instance, experts or engineers can utilize weather models to simulate extreme weathers and obtain simulated environmental parameters, such as wind speed, turbulence intensity, vertical wind shear, and horizontal wind shear etc. The function can be a linear function, or a non-linear function represented by a neural network.

The reinforcement learning algorithm 700 also includes a policy module 702 that comprises one or more policies. The policy module 702 can determine a policy associated with a mapping from environmental states—obtained from the environmental module 701—to controlling actions to be taken when in those states. The policy may be a simple function or a lookup table for some examples, whereas it may involve extensive computation such as search process in other examples. In addition, the policy can also be a non-linear function realized by a neural network executing a supervised learning algorithm.

The reinforcement learning algorithm 700 also includes an agent module 703. The agent module 703 is configured to apply the one or more controlling actions, based on the input of the policy module 702. The agent module 703 cooperates with the policy module 702, and also with a reward module 704.

The reinforcement algorithm 700 also includes the reward module 704. The reward module 704 can determine a reward value in a short-term temporal context after performing each determined action—i.e., without any changes in the environmental states. The reward module 704 also can determine a long-term reward value. The objective of the agent module 703 is to optimize the reward value. The reward value thus defines what are the "good" and "bad" actions to be performed in a given state. The reward value may be used to alter the policy of the policy module 702; if a controlling action determined based on the policy is followed by low reward, then the policy may be changed to select some other controlling actions in that situation in the future. In general, the reward value may be a value of a stochastic function of the state of the environment and the controlling actions taken.

Next, the function of the reinforcement learning algorithm 700 will be explained.

The agent module 703 interacts with the environment of the wind turbine 80. See action $A_t$. In this process, the agent module 703 cooperates with the reward module 704 to obtain a reward value for determining the appropriate controlling action. Then the agent module 703 may determine the next controlling action based on previous reward value and in this way define the next controlling action, which will then result in new reward values, and so on. So, these terms, agent, environment, state, action (or controlling action), and reward, are the most important ones to understand it.

In FIG. 2, the subscript t refers to the current timestep and t+1 to the next timestep. The agent module 703 is in a current state $S_t$ associated with a current reward value $R_t$. The agent module 703 then applies the determined controlling action $A_t$, and thus also may change the environment. As a result, a reward value $R_{t+1}$ is gained, that can be either positive or negative, and the state changes, $S_{t+1}$. This is illustrated by the feedback branch 710.

This idea of reinforcement learning is different from other Machine Learning techniques. In supervised learning, a target variable is known upfront, and an algorithm can learn the pattern between dependent and independent variables. In unsupervised learning, no target variable is known. In Reinforcement Learning, new knowledge is "learned" with time. In this regard reinforcement Learning is a mixture of unsupervised and supervised learning. It comes closest to "human" learning.

Next, a practical example of using reinforcement learning for control of a wind turbine, in particular start-up and idling, is explained. The environmental state is monitored by the environmental module 701. The environmental state corresponds to the wind-turbine 80 in the field at stand-still and technically able to try a turbine start. The environmental module 701 communicates with the wind turbine's controller which may have access to all measurement data and provide the measurement data to the environmental module 701. The agent module 703 can apply controlling actions based on a reference reward value or a predicted reward value obtained from the reward module 704, the current state $S_t$ of the wind turbine 80, the measured reward value $R_t$, and the policy of the policy module 702.

The possible actions that the wind turbine 80 can perform based on its state and reward, are: don't start (keep idling); start the turbine.

The state $S_t$ is defined by some or all parameters that have an impact on cutting-in of the turbine. Among these are: Measured wind speed (by nacelle anemometer); Turbulence intensity; Site elevation; Outdoor temperature; Vertical or horizontal wind shear (if any of these are available from more complex measurement devices or control algorithms).

The reward value is defined as the produced power of the wind turbine 80.

An iterative learning process is performed, in which the turbine 80 for each timestep measures its state and decides for an action (start or don't start). Then, it gets a reward (produced power after start or power at standstill) and has a new state, which is defined by its condition measurements.

The learning process is continuous, because the algorithm runs repeatedly for the complete lifetime of the turbine—this is in contrast to a one-time parameter definition upfront.

With this setup, the algorithm 700 learns to adapt to its ambient conditions and can start-up the wind turbine 80 whenever the best conditions are available. The learning process goes on, so the turbine 80 learns to adapt to new states, e.g., a service technician slightly changes the mounting of anemometer and thus changes wind speed reading, or it can adapt to day/night changes, seasonal changes, etc.

Next, details with respect to the policy of the policy module 702 are explained in connection with FIG. 2.

Figure 3:
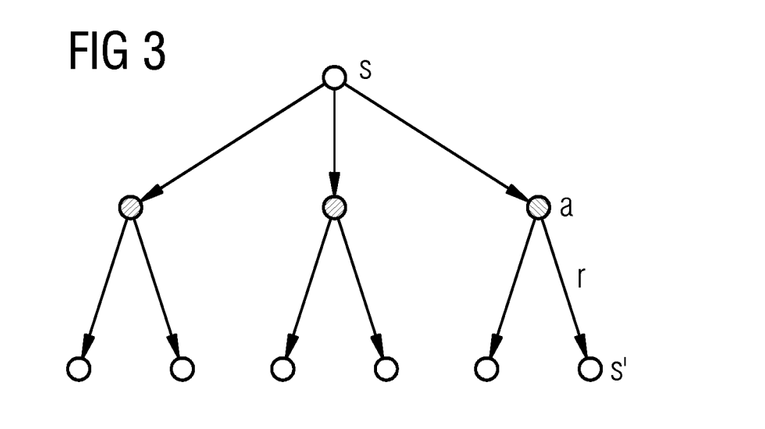
FIG. 3 schematically illustrates a diagram for a policy $\pi$ in connection with a reinforcement learning algorithm.

FIG. 3 is a diagram for a policy, $\pi$, by which a look-ahead from an environmental state s to its possible successor environmental states s'. Each open circle represents an environmental state and each solid circle represents a state-action pair, (s, a). Starting from environmental state, s, the root node at the top, the agent module 703 could take any of some set of actions—three are shown in the diagram—based on its policy $\pi$. From each of these, the environmental module 701 could respond with one of several next environmental state, s' (two are shown in the figure), along with a reward, r, depending on its dynamics given by a function p.

The value function specifies what is good in a long run. Roughly speaking, the value of a future state is the predicted total amount of reward that the agent module 703 can accumulated over the future, starting from the current state, by selecting a chain of controlling actions successively. Whereas the reward value determines the immediate desirability of environmental states, the value of value function indicates the long-term desirability of the chain of states after taking into account the states that are likely to follow and the rewards available in those states. For example, a state might always yield a low reward value, but still have a high value of the value function, because it is regularly followed by other states that yield high rewards.

The model for representing the environment considered by the policy module 702 is something which mimics behaviors of the environment, or more generally, which allows inferences to be made about how the environment will behave. For instance, the model might infer the next state and next reward given a state and action.

In various embodiments, solving a reinforcement learning task means, roughly, finding a policy that achieves a high reward value, e.g., immediately for fixed environmental states or over a long run for varying environmental states. An optimal policy is defined to be better than or equal to any other policies if its reward value or the value of the value function is greater than or equal to that of any other policies for all states.

Figure 4:
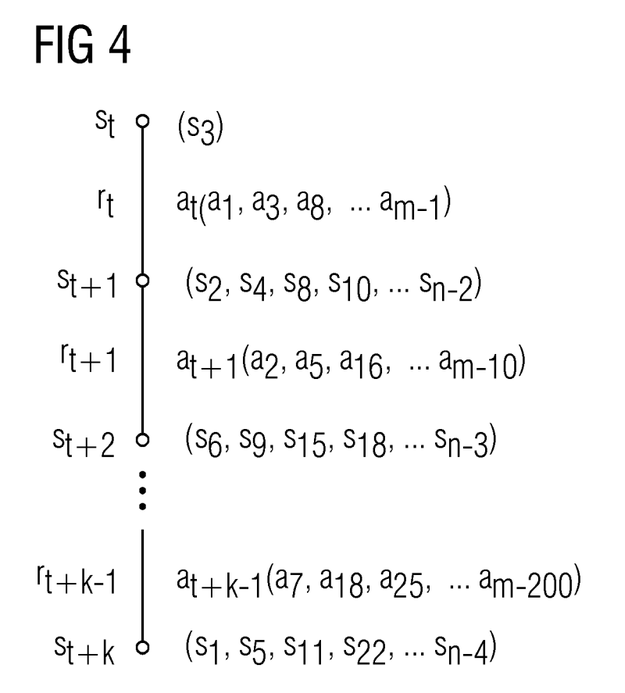
FIG. 4 is an example state tree to schematically illustrate core ideas of reinforcement learning algorithms that are utilized in various embodiments of this application.

FIG. 4 is an example state tree to schematically illustrate aspects of reinforcement learning algorithms that are utilized in various embodiments of this application.

This state tree includes a plurality of nodes ($s_t$, $s_{t+1}, \ldots, s_{t+k}$), and a plurality of edges ($a_t, a_{t+1}, \ldots, a_{t+k-1}$). $S_t$ indicates a current environmental state at time or step t. $s_{t+1}, s_{t+2}, S_{t+k}$ indicate three future environmental states at step or time t+1, t+2, and t+k, respectively. $a_t, a_{t+1},$ and $a_{t+k-1}$ indicate actions taken at state $s_t, s_{t+1},$ and $s_{t+k-1}$, respectively.

Each environmental state of $s_t, s_{t+1}, \ldots,$ and $S_{t+k}$ may be a member of a subset or complete set of an environmental state space $S=\{s_1, s_2, \ldots, s_{n-1}, s_n\}$, in which n may be finite or infinite. Each member of the environmental state space S represents an environmental state which has been or would be encountered by the agent. Each action of $a_t, a_{t+1}, \ldots,$ and $a_{t+k-1}$ may be selected from a subset or complete set of an action space $A=\{a_1, a_2, \ldots, a_m\}$, in which m may be finite or infinite. Each member of the action space represents an action that has been or would be performed by the agent module 703.

There are various options available for determining the one or more controlling actions. Two options that can be applied are (i) action-reward methods and (ii) action-value methods.

First (i) action-reward methods will be explained.

Each action may be associated with a reference reward value given that that respective action is taken at a respective environmental state. For example, $r_t$ is the reference reward value given that $a_t$ is taken at $s_t$, and $r_t$ may be determined by a function of $a_t$ and $s_t$, e.g., $r_t=f(s_t, a_t)$, which may comprise a linear function or a neural network. Thus, different combinations of $(s_t, a_t)$ result in different reference reward values and different actions taken at $s_t$ correspond to different reference reward values. For instance, $r_t=f(s_3, a_8)$, if $a_8$ is selected as the action $a_t$ at $s_t=s_3$.

For instance, the neural network for determining the reference reward value could be trained based on training data available based on historical site measurements of the environmental state. The neural network could be a convolutional neural network.

At the current state $s_t$, in some cases, one action, e.g., $a_t$, may be determined based on a predefined set of actions, e.g., $\{a_1, a_3, \ldots, a_8, \ldots a_{m-1}\}$, which is a subset of the action space A, by taking the respective reference reward value, e.g., $r_t$, into account. For example, the action $a_t$ may be determined as the one with the maximum reference reward value in the predefined set of actions. Alternatively, or additionally, the action $a_t$ may be determined based on a predefined set of actions, e.g., $\{a_1, a_3, \ldots a_8, \ldots a_{m-1}\}$, using an arbitrary selection (i.e., using a random contribution).

In some other cases, at the current state $s_t$, more actions, e.g., $a_t$ and $a_{t+1}$, may be determined based on more predefined set of actions, e.g., $\{a_1, a_3, a_8, \ldots a_{m-1}\}$ and $\{a_2, a_5, a_{16}, \ldots a_{m-1}\}$, respectively, by taking the respective reference reward values, e.g., $r_t$ and $r_{t+1}$, into account. For example, both $a_t$ and $a_{t+1}$ may be determined as the one with the maximum reference reward value in the predefined set of actions, respectively. Alternatively or additionally, the actions $a_t$ and $a_{t+1}$ may be determined based on predefined set of actions, e.g., $\{a_1, a_3, a_8, \ldots a_{m-1}\}$ and $\{a_2, a_5, a_{16}, \ldots a_{m-10}\}$, using an arbitrary selection (i.e., using a random contribution). In addition, the more predefined set of actions may be the same or different.

After applying the determined one or more actions, the reinforcement learning algorithms will receive measurement data associated with a current reward value, which is a real reward value (i.e., not a predefined reference reward value). For instance, this measurement could be a power measurement of a power output of the generator. For example, after applying $a_t$ or $a_t$ and $a_{t+1}$, the reinforcement learning algorithms will receive the current reward value at time (or step) t+1 or t+2, respectively. Then, the reinforcement learning algorithms will perform a comparison between the reference reward value and the current reward value. Afterwards, the reinforcement learning algorithms are trained based on the comparison. As will be appreciated, the reinforcement learning algorithm can thus be trained without requiring predefined labeled training data (as would be the case, e.g., for supervised learning). Rather, during operation of the wind turbine, the training can be implemented using the comparison between the reference reward value (anticipated in the model) and the actual reward value indicated by the measurement data.

Next, (ii) action-value methods will be explained for determining the appropriate controlling action.

In some embodiments, at the current state $s_t$, the reinforcement learning algorithms may predict a reward value for a future point in time, e.g., time t+1 or t+k, for k>1, based on a predefined value function of the reinforcement learning algorithms. The value function may comprise a linear function or a neural network. Thus, a predicted reward value is obtained.

For instance, the neural network could be trained based on training data available based on historical site measurements of the environmental state. The neural network could be a convolutional neural network.

Then, one action $a_t$ or a chain of actions from $a_t$ to $a_{t+k-1}$ are determined based on the corresponding set of actions, respectively, by taking the predicted reward value into account. For example, the action $a_t$ or the chain of actions from $a_t$ to $a_{t+k-1}$ may be determined as the one or the chain with the maximum predicted reward value.

After applying the determined one action $a_t$ or chain of actions from $a_t$ to $a_{t+k-1}$, the reinforcement learning algorithms will receive measurement data associated with a current aggregate reward value. For example, after applying $a_t$ or the chain of actions from $a_t$ to $a_{t+k-1}$, the reinforcement learning algorithms will receive the current reward value at time (or step) t+1 or t+k, respectively. Then, the reinforcement learning algorithms will perform a comparison between the predicted reward value and the current aggregate reward value. Afterwards, the reinforcement learning algorithms are trained based on the comparison.

By using reinforcement learning, appropriate control actions can be taken for the operational control of a wind turbine, without requiring supervision or complete models of the environment.

Reinforcement learning can also make use of as many environmental parameters as possible to precisely select actions. In addition, the learning process of the reinforcement learning algorithms continues during normal operation of the wind turbine, therefore, the agent can learn to adapt to new environmental states. Thus, optimal short-term or long-term goals can be achieved by applying the reinforcement learning algorithms.

Figure 5:
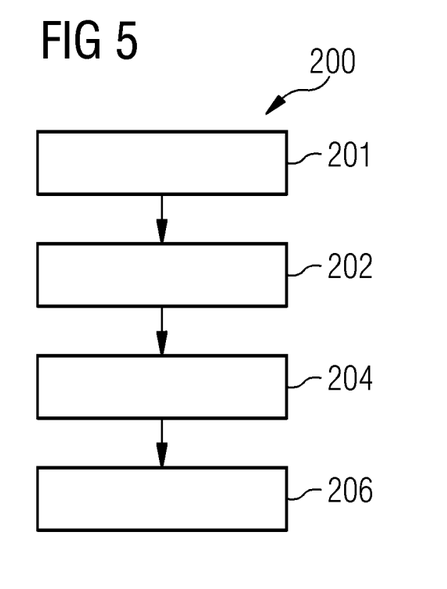
FIG. 5 is a flow diagram of an example method for controlling a wind turbine in response to an environmental state.

FIG. 5 is a flow diagram of an example method 200 for controlling a wind turbine (e.g., the wind turbine 80 of FIG. 1) in response to an environmental state. For convenience, the method will be explained as being performed by a system of one or more computers located in one or more locations. For example, a reinforcement learning system running one or more reinforcement learning algorithms mentioned above, can perform the method 200.

The method of FIG. 5 can employ one or more reinforcement learning algorithms 700 as described above in connection with the preceding FIGs.

At optional step 201, the reinforcement learning algorithm is pre-trained by using tuples of environmental states, controlling actions, and net power outputs which are obtained from other wind turbines or expert knowledge, before implementing the reinforcement learning algorithm to control the wind turbine.

Then, for the following steps the (pre-trained) reinforcement learning algorithm is applied.

At step 202, data indicative of a current environmental state of the wind turbine is received.

The current environmental state of the wind turbine specifies a value of at least one of the following parameters: a wind speed, a turbulence intensity, a site elevation, a temperature, a vertical wind shear, or a horizontal wind shear. The one or more controlling actions comprise at least one of keep-idling or start-up.

At step 204, one or more controlling actions of the wind turbine based on the current environmental state of the wind turbine and a reinforcement learning algorithm, e.g., the reinforcement learning algorithm 700 of FIG. 2, are determined.

The reinforcement learning algorithm may utilize any one of the above-mentioned action-reward methods or the action-value methods. In addition, the reinforcement learning algorithm also may utilize other existing reinforcement learning algorithms, such as, Q-Learning, Deep Q-Learning, Double Deep Q-Learning, Dynamic Programming (DP), Temporal-Difference (TD) Learning, Monte Carlo Methods, Policy Gradient Methods, On-policy Prediction with Approximation, etc.

When determining the one or more controlling actions, it is possible to take into account one or more reward values. For example, reference reward values or predicted reward values can be used. Reward values can, in particular, include the net power output of the wind turbine.

In some cases, the one or more controlling actions are determined based on a predefined set of controlling actions (e.g., by an appropriate selection process) from the predefined set, wherein each of the controlling actions in the predefined set of controlling actions is associated with a reference reward value given that that respective controlling action is determined at the current environmental state.

A respective reference reward for each controlling action in the predefined set of controlling actions may be respectively generated by processing the current environmental state together with the corresponding controlling action using an action reward neural network. The action reward neural network may be trained by supervised learning using labeled data obtained from experiences. Alternatively, a database which stores arrays or tables representing mappings from (environmental state, action) pairs to reference rewards may be searched.

In some implementations, the action reward neural network is configured to receive as input a current state together with a controlling action and to process the current state together with the controlling action to generate a respective reference reward for the action.

The one or more controlling actions are determined based on the predefined set of controlling actions taking the respective reference reward value into account. For example, the one or more controlling actions may be determined as one or more controlling actions with the maximum reference reward or maximum sum of reference reward. Sometimes, to balance exploration and exploitation of the reinforcement learning algorithm, the one or more controlling actions are determined based on the predefined set of controlling actions using an arbitrary selection. For instance, it would be possible to randomly or at least partly randomly select (arbitrary selection) one or more controlling action from the predefined set of controlling actions with a probability $\in (0<\in<1)$ and select one or more controlling actions with the maximum reference reward or maximum sum of reference reward with a probability $1-\in$. It is preferred to set $0<\in<0.1$.

In some other cases, a reward value for a future point in time may be predicted based on a predefined value function of the reinforcement learning algorithm, wherein the one or more controlling actions are determined based on a predefined set of controlling actions taking the predicted reward value into account.

The value function is used to predict a long-term reward, such as, several hours, a whole day, a week and so on. On this timescale, typically the environmental conditions change. On the other hand, the above-mentioned reference reward is used to estimate a short-term reward, such as, one minute or several minutes where environmental conditions are considered to be rather stable.

For example, it would be possible to predict a respective reward value for a future point in time for each possible chain of controlling actions selected from the predefined set of controlling actions, respectively, by processing the current environmental state together with the corresponding chain of controlling actions using an action value neural network. The action value neural network may be trained by supervised learning using labeled data obtained from experiences. Alternatively, the value function may be a predefined linear function.

In some implementations, the action value neural network is configured to receive as input a current state together with a chain of controlling actions and to process the current state together with the chain of controlling actions to generate a respective reward value for a future point for the chain of controlling actions.

After generating reward values of all or part of possible chains of controlling actions starting from the current state and ending at the future point, it is possible to determine the chain of controlling actions with the highest predicted reward value as the one or more controlling actions to be performed.

At step 206, the determined one or more controlling actions are applied to the wind turbine. After the determination of the one or more controlling actions by the reinforcement learning algorithm, it is possible to apply the one or more controlling actions to control the wind turbine.

In some cases, for the action-reward methods, upon applying the determined one or more controlling actions, measurement data associated with a current reward value is received, and a comparison between the reference reward value and the current reward value is performed, and the reinforcement learning algorithm is trained based on the comparison.

In some other cases, for the action-value methods, upon applying the determined one or more controlling actions, it is possible to receive a measurement associated with a current aggregate reward value, performs a comparison between the predicted reward value and the current aggregate reward value, and trains the reinforcement learning algorithm based on the comparison.

In addition, either the reference reward or the predefined value function comprises a net power output of the wind turbine or other parameters for assessing the performance of the wind turbine.

The method 200 for controlling a wind turbine can learn by the reinforcement learning algorithms from direct interaction with the environment, without requiring exemplary supervision or complete models of the environment. The reinforcement learning algorithms can also make use of as many environmental parameters as possible to precisely select controlling actions of the wind turbine. In addition, the learning process of the reinforcement learning algorithms never end, therefore, the reinforcement learning algorithms can learn to adapt to new environmental states. Thus, optimal short-term and/or long-term goals, such as, net power output of the wind turbine, can be achieved by applying the reinforcement learning algorithms to control the wind turbine.

In various embodiments, a prediction of future environmental states of the wind turbine using an environmental states prediction model can be performed. The environmental states prediction model may be a neural network.

The environmental states prediction neural network is configured to receive as input a current weather information and information of mechanical structure of the wind turbine to generate future environmental states including predictions of at least one of the following parameters: a wind speed, a turbulence intensity, a site elevation, a temperature, a vertical wind shear, or a horizontal wind shear. The current weather information comprises various images and/or data captured by weather satellites or radars, data measured by equipment or devices at weather stations.

Also, a current weather information and information of mechanical structure of the wind turbine may be received and future environmental states may be generated by the environmental states prediction neural network. Then, it is possible to determine one or more controlling actions of the wind turbine based on not only the current environmental state but also the future environmental states of the wind turbine and a reinforcement learning algorithm. Both the short-term reward and the long-term reward are predicted by further taking the future environmental states into account.

By further taking predictions of future environmental states into account, the method 200 for controlling a wind turbine can utilize more information of the environment to determine more precise and reliable controlling actions and further obtain more power output.

Figure 6:
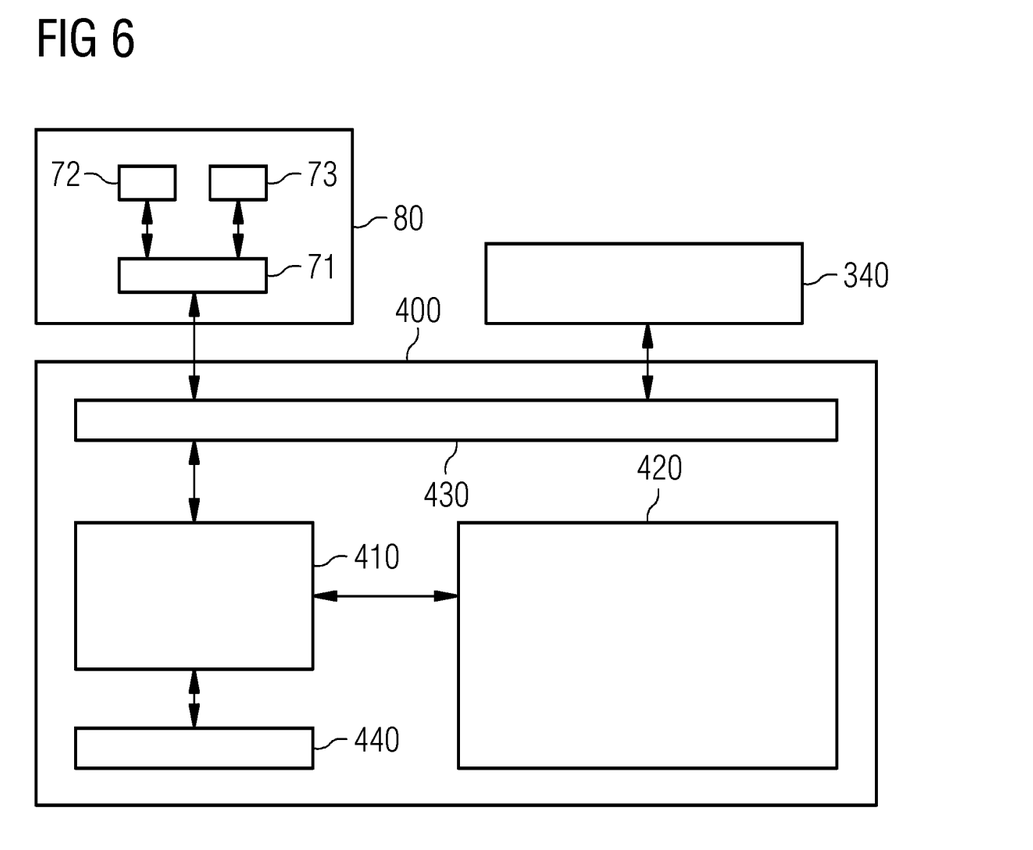
FIG. 6 schematically illustrates aspects with respect to a system that can be configured to execute the method for controlling a wind turbine.

FIG. 6 schematically illustrates aspects with respect to a device 400. The device 400 includes one or more processors 410 and a memory 420. The one or more processors 410 can load program code from the memory 420 and execute the loaded program code. The program code could define the reinforcement learning algorithm 700 and the modules 701-704 (cf. FIG. 2).

Then, the one or more processors 410 can perform various techniques as described herein to control the wind turbine 310. The one or more processors 410 may comprise CPUs, GPUs, TPUs, or any other neural network processors.

Specifically, the one or more processors 410 are configured to receive a current environmental state of the wind turbine 80, determine one or more controlling actions of the wind turbine 80 based on the current environmental state of the wind turbine 80 and a reinforcement learning algorithm, and apply the determined one or more controlling actions to the wind turbine 80.

The wind turbine 80 can thus include a communication interface 71, one or more sensors 72, and a control unit 73.

The device 400 includes a communication interface 430. For example, the device 400 may receive a current environmental state of the wind turbine 80 via the communication interface 430 from sensors 72 associated with the wind turbine 80. It would be also possible that the device 400 receives a current weather information from a database 340 that belongs to a meteorological center. In addition, the device 400 may send to the controlling element 73 of the wind turbine 80, controlling signals including the one or more controlling actions, via the communication interface 430.

The device 400 may include a user interface 440 for users to interact with the device 400. For example, the user can input data or information into the device 400 via the user interface 440, such as, tuples of environmental states, controlling actions, and net power outputs which are obtained from other wind turbines or expert knowledge, information of mechanical structure of the wind turbine.

The device 400 may be used to execute the program codes of the above-mentioned reward neural network, value neural network, and environmental states prediction neural network, respectively.

Summarizing, techniques of controlling a wind turbine based on reinforcement learning have been described. This is used to make efficient use of various environmental information, including but not limited to the wind speed, to control the wind turbine, thereby achieving an optimal power output of the wind turbine.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A method of controlling a wind turbine, comprising:
   receiving data indicative of a current environmental state of the wind turbine, wherein the current environmental state of the wind turbine specifies a plurality of the following: a wind speed, a turbulence intensity, a site elevation, a temperature, a vertical wind shear, or a horizontal wind shear;
   determining one or more controlling actions of the wind turbine based on the current environmental state of the wind turbine and a reinforcement learning algorithm, wherein the one or more controlling actions comprise at least one of keep-idling or start-up;
   predicting a reward value for a future point in time for possible chains of controlling actions selected from a predefined set of controlling actions, respectively, by processing the current environmental state together with a chain of controlling actions using a predefined value function of the reinforcement learning algorithm, wherein the one or more chains of controlling actions are determined based on a highest predicted reward value for the future point in time for the chain of controlling actions; and
   controlling the wind turbine by applying the one or more controlling actions to the wind turbine.

2. The method of claim 1, wherein the one or more controlling actions are determined based on a predefined set of controlling actions, wherein each of the controlling actions in the predefined set of controlling actions is associated with a reference reward value, and wherein each of the one or more controlling actions is determined at the current environmental state.

3. The method of claim 2, wherein the one or more controlling actions are determined based on the predefined set of controlling actions taking the respective reference reward value into account.

4. The method of claim 2, wherein the one or more controlling actions are determined based on the predefined set of controlling actions using an arbitrary selection.

5. The method of claim 2, further comprising:
   upon applying the one or more controlling actions: receiving measurement data associated with a current reward value;
   performing a comparison between the reference reward value and the current reward value; and training the reinforcement learning algorithm based on the comparison.

6. The method of claim 2, wherein the reward value comprises a net power output of the wind turbine.

7. The method of claim 1, wherein the value function comprises a linear function or a neural network.

8. The method of claim 1, further comprising:
upon applying the one or more controlling actions: receiving measurement data associated with a current aggregate reward value;
performing a comparison between the predicted reward value and the current aggregate reward value; and
training the reinforcement learning algorithm based on the comparison.

9. The method of claim 1, further comprising:
pre-training the reinforcement learning algorithm by using tuples of environmental states, controlling actions, and net power outputs which are obtained from other wind turbines or expert knowledge.

10. The method of claim 1, further comprising:
performing a prediction of future environmental states using an environmental states prediction model, wherein the environmental states prediction model receives as input a current weather information and information on a mechanical structure of the wind turbine to generate future environmental states.

11. A device for controlling a wind turbine, the device comprising one or more processors, the one or more processors being configured to:
receive data indicative of a current environmental state of the wind turbine, wherein the current environmental state of the wind turbine specifies a plurality of the following: a wind speed, a turbulence intensity, a site elevation, a temperature, a vertical wind shear, or a horizontal wind shear;
determine one or more controlling actions of the wind turbine based on the current environmental state of the wind turbine and a reinforcement learning algorithm, wherein the one or more controlling actions comprise at least one of keep-idling or start-up;
predict a reward value for a future point in time for possible chains of controlling actions selected from a predefined set of controlling actions, respectively, by processing the current environmental state together with a chain of controlling actions using a predefined value function of the reinforcement learning algorithm, wherein the one or more chains of controlling actions are determined based on a highest predicted reward value for the future point in time for the chain of controlling actions; and
control the wind turbine by applying one or more controlling actions to the wind turbine.

12. The device of claim 11, wherein the one or more processors are further configured to:
perform a prediction of future environmental states using an environmental states prediction model, wherein the environmental states prediction model receives as input a current weather information and information on a mechanical structure of the wind turbine to generate future environmental states.

* * * * *